(12) United States Patent
Yonezawa et al.

(10) Patent No.: US 8,585,923 B2
(45) Date of Patent: Nov. 19, 2013

(54) WHOLLY AROMATIC LIQUID-CRYSTALLINE POLYESTER RESIN AND COMPOSITION COMPRISING THE SAME

(75) Inventors: Satoru Yonezawa, Osaka (JP); Hisanari Fujiwara, Osaka (JP); Tetsuhide Sawada, Osaka (JP)

(73) Assignee: Ueno Fine Chemicals Industry, Ltd., Osaka-shi (JP)

( * ) Notice: Subject to any disclaimer, the term of this patent is extended or adjusted under 35 U.S.C. 154(b) by 0 days.

(21) Appl. No.: 13/327,049

(22) Filed: Dec. 15, 2011

(65) Prior Publication Data
US 2012/0153224 A1    Jun. 21, 2012

(30) Foreign Application Priority Data
Dec. 16, 2010   (JP) .................. 2010-280436

(51) Int. Cl.
| | |
|---|---|
| C09K 19/06 | (2006.01) |
| C09K 19/52 | (2006.01) |
| C09K 19/32 | (2006.01) |
| C09K 19/30 | (2006.01) |
| C09K 19/00 | (2006.01) |
| B32B 27/06 | (2006.01) |
| C08G 63/18 | (2006.01) |

(52) U.S. Cl.
USPC ............ 252/299.6; 252/299.01; 252/299.62; 252/299.63; 428/1.1; 428/480; 528/193

(58) Field of Classification Search
USPC ............ 252/299.01, 299.6, 299.62, 299.63; 428/1.1, 480; 528/193
See application file for complete search history.

(56) References Cited

U.S. PATENT DOCUMENTS

| | | | |
|---|---|---|---|
| 6,846,433 B2 * | 1/2005 | Okamoto et al. | 252/299.01 |
| 7,304,121 B2 * | 12/2007 | Kato et al. | 528/176 |
| 8,044,151 B2 * | 10/2011 | Asahara et al. | 528/176 |
| 2003/0089887 A1 | 5/2003 | Okamoto et al. | |

FOREIGN PATENT DOCUMENTS

| | | |
|---|---|---|
| EP | 0 359 490 A2 | 3/1990 |
| JP | 2-75653 A | 3/1990 |
| JP | 6-32880 A | 2/1994 |
| JP | 10-36641 A | 2/1998 |
| JP | 10-158482 A | 6/1998 |
| JP | 11-48278 A | 2/1999 |
| JP | 11-140283 A | 5/1999 |
| JP | 11-199761 A | 7/1999 |
| JP | 2003-96279 A | 4/2003 |
| JP | 2003-211443 A | 7/2003 |
| JP | 2004-196886 A | 7/2004 |

* cited by examiner

Primary Examiner — Geraldina Visconti
(74) Attorney, Agent, or Firm — Sughrue Mion, PLLC

(57) ABSTRACT

The present invention provides a wholly aromatic liquid-crystalline polyester resin, consisting of the repeating units shown by the formulae [I]-[V]:

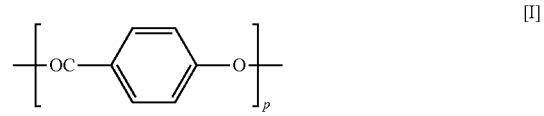
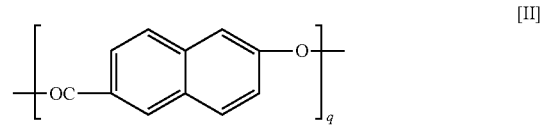
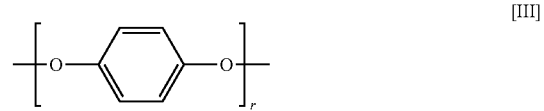
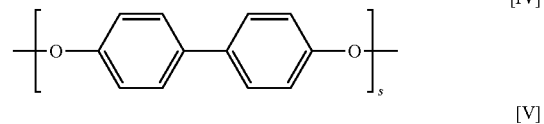
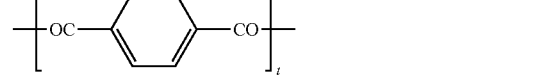

wherein p, q, r, s and t represent molar proportion (mol %) of repeating units respectively in the liquid-crystalline polyester resin and satisfy the following formulae:

$25 \leq p \leq 45$;

$2 \leq q \leq 10$;

$10 \leq r \leq 20$;

$10 \leq s \leq 20$;

$20 \leq t \leq 40$;

$r > s$;

$p+q+r+s+t=100$;

having a ratio P1/P2 of equal to or lower than 3.0, wherein P1 is a melt viscosity at a crystalline melting temperature measured under the condition of shear rate 1000 sec$^{-1}$ and P2 is a melt viscosity at a temperature of the crystalline melting temperature +20° C. measured under the same condition as P1; and having a deflection temperature under load (DTUL) of equal to or higher than 230° C.

6 Claims, No Drawings

WHOLLY AROMATIC LIQUID-CRYSTALLINE POLYESTER RESIN AND COMPOSITION COMPRISING THE SAME

TECHNICAL FIELD

The present invention relates to a wholly aromatic liquid-crystalline polyester resin and a composition comprising the same which cause less blister formation on a molded article made of the resin or the composition. The present invention also relates to a wholly aromatic liquid-crystalline polyester resin and a composition comprising the same which can be produced at low cost.

BACKGROUND OF THE INVENTION

Thermotropic liquid-crystalline polyester resin (which is hereinafter abbreviated to "LCP") has good properties including heat resistance, mechanical properties such as rigidity, chemical resistance and dimensional accuracy. Owing to those properties, LCPs are used not only for manufacturing molded articles but also for a variety of products including fibers and film.

In the information and telecommunication fields, very thin parts are sometimes required. Personal computers and mobile phones in particular employ highly integrated devices and the art wishes to use downsized, thinner and smaller parts for them. Because of the excellent molding processability of the LCPs, i.e., good flowability and less formation of flash, consumption of LCPs has been increasing recently.

For mounting electronic components such as connectors, environmentally conscious lead free solders are preferably used these days. The reflow temperature of the lead-free solders is relatively high and the higher temperature sometimes causes blister formation on the surface of the molded article made of the LCPs.

The blister formation is believed to be caused by air existing in dies and/or hoppers as well as decomposed gas, air and/or water embed in resins.

In addition, the higher reflow temperature may also cause warpage of the molded article made of LCPs. In order to avoid the development of warpage, fillers such as talc have been added to the LCPs.

The development of warpage is suppressed in the LCP compositions comprising talc. However, talc comprises a small amount of water and the LCP compositions comprising talc have the problem of blister formation because of the water introduced simultaneously with talc.

In order to avoid blister formation on the surface of the molded article made of LCPs, various strategies have been proposed. For example, adding additives such as silicone rubber, phosphoric compound or boric compound to the LCP composition (Japanese Patent Application Laid Open Nos. 02-075653, 06-032880, 10-036641, 10-158482, 11-140283, 11-199761, 2003-096279 (corresponding to US2003089887) and 2004-196886, the references are herein incorporated by reference); controlling the screw compression ratio upon injection molding of the LCP (Japanese Patent Application Laid Open No. 11-048278); and adjusting the screw of a kneader for kneading the LCP and the inorganic fillers so that the meshing ratio of the screw is within a certain range (Japanese Patent Application Laid Open No. 2003-211443) have been proposed.

However, methods which comprise adding various additives in order to avoid blister formation are not sufficient in terms of their effects on suppressing blister formation and may involve the problems of significantly impairing the mechanical properties of the LCP compositions depending on the type of additives.

Further, methods which comprise controlling the screw setting upon injection molding or upon kneading LCPs and inorganic fillers have the problem of a heavier work burden compared to the methods which comprise adding additives to the LCPs.

Therefore, the art wishes an improved LCP which exhibits less blister formation on the molded article made of the same without the need for controlling the screw setting upon molding the LCP and without the need for addition of additives to the LCP.

SUMMARY OF THE INVENTION

One object of the present invention is to provide a wholly aromatic liquid-crystalline polyester resin and a wholly aromatic liquid-crystalline polyester resin composition which show reduced blister formation on molded articles made therefrom upon molding or upon soldering at low cost. In other words, the object of the present invention is to provide a wholly aromatic liquid-crystalline polyester resin and a wholly aromatic liquid-crystalline polyester resin composition which show high blister resistance at low cost.

The present inventors found that a liquid-crystalline polyester resin which is obtained by condensation-polymerizing of certain monomers which give certain repeating units at certain proportions exhibits significantly improved blister resistance without impairing other properties such as heat resistance, mechanical properties and the like, and that the liquid-crystalline polyester resin can be produced at low cost.

Specifically, the present invention provides a wholly aromatic liquid-crystalline polyester resin, consisting of the repeating units shown by the formulae [I]-[V]:

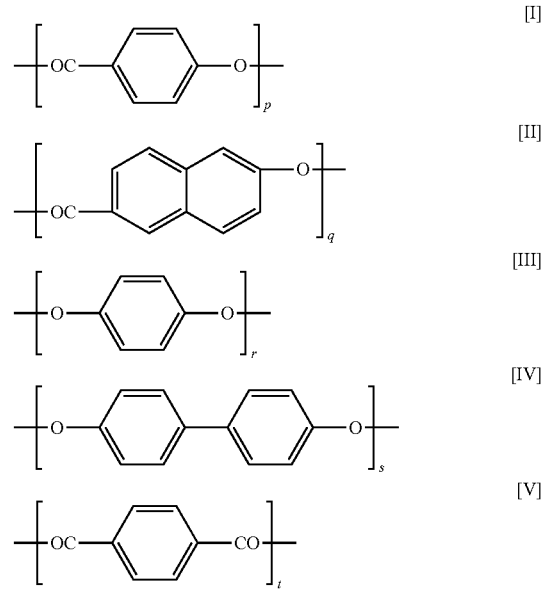

wherein p, q, r, s and t represent molar proportion (mol %) of repeating units respectively in the liquid-crystalline polyester resin and satisfy the following formulae:

$25 \le p \le 45;$ $2 \le q \le 10;$ $10 \leq r \leq 20;$ $10 \leq s \leq 20;$ $20 \leq t \leq 40;$ $r > s;$ $p+q+r+s+t=100;$ having a ratio P1/P2 of equal to or lower than 3.0, wherein P1 is a melt viscosity at a crystalline melting temperature measured under the condition of shear rate 1000 sec$^{-1}$ and P2 is a melt viscosity at a temperature of the crystalline melting temperature +20° C. measured under the same condition as P1; and having a deflection temperature under load (DTUL) of equal to or higher than 230° C.

BEST MODE FOR CARRYING OUT THE INVENTION

The wholly aromatic liquid-crystalline polyester resin of the present invention is a liquid-crystalline polyester resin which exhibits anisotropic melt phase and is called thermotropic liquid-crystalline polyester resin by those skilled in the art.

The anisotropic melt phase can be confirmed by means of a conventional polarized light system using an orthogonal light polarizer. In more detail, the sample on the hot stage under a nitrogen atmosphere may be observed.

The wholly aromatic liquid-crystalline polyester resin of the present invention is composed of aromatic oxycarbonyl repeating units, aromatic dioxy repeating units and an aromatic dicarbonyl repeating unit.

The wholly aromatic liquid-crystalline polyester resin of the present invention essentially comprises p-oxybenzoyl repeating unit represented by formula [I] and 6-oxy-2-naphthoyl repeating unit represented by formula [II] as aromatic oxycarbonyl repeating units:

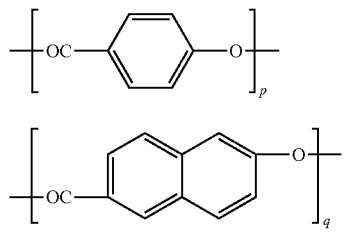

wherein p and q represent molar proportion (mol %) of repeating units represented by formulae [I] and [II] respectively in the wholly aromatic liquid-crystalline polyester resin of the present invention.

The wholly aromatic liquid-crystalline polyester resin of the present invention comprises 25-45 mol %, preferably 30-45 mol %, and more preferably 30-40 mol % of the repeating unit represented by formula [I] based on the total amount of repeating units and comprises 2-10 mol %, preferably 3-9 mol %, more preferably 3-6 mol % of the repeating unit represented by formula [II] based on the total amount of repeating units constituting the wholly aromatic liquid-crystalline polyester resin of the present invention.

Examples of monomers which provide the repeating unit represented by formula [I] include p-hydroxybenzoic acid and ester-forming derivatives such as acyl derivatives, ester derivatives and acid halide thereof.

Examples of monomers which provide the repeating unit represented by formula [II] include 6-hydroxy-2-naphthoic acid and ester-forming derivatives such as acyl derivatives, ester derivatives and acid halide thereof.

The wholly aromatic liquid-crystalline polyester resin of the present invention essentially comprises the repeating units represented by formulae [III] and [IV] as aromatic dioxy repeating units:

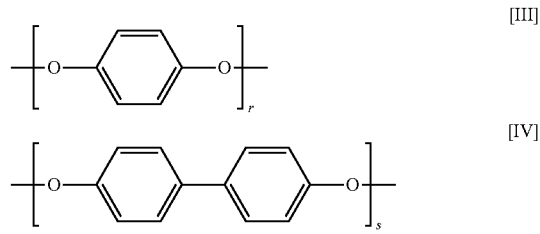

wherein r and s represent molar proportion (mol %) of repeating units represented by formulae [III] and [IV] respectively in the wholly aromatic liquid-crystalline polyester resin of the present invention and satisfy the formula:

$r > s.$

The wholly aromatic liquid-crystalline polyester resin of the present invention comprises 10-20 mol %, preferably 13-20 mol %, more preferably 13.5-18.5 mol %, and the most preferably 16-18 mol % of the repeating unit represented by formula [III] based on the total amount of repeating units and comprises 10-20 mol %, preferably 10-17 mol %, more preferably 11.5-15.5 mol %, and the most preferably 12-14 mol % of the repeating unit represented by formula [IV] based on the total amount of repeating units constituting the wholly aromatic liquid-crystalline polyester resin of the present invention.

In addition, in the wholly aromatic liquid-crystalline polyester resin of the present invention, the molar proportion (mol %) of the repeating unit represented by formula [III] is higher than the molar proportion (mol %) of the repeating unit represented by formula [IV].

Examples of monomers which provide the repeating unit represented by formula [III] include hydroquinone and ester-forming derivatives such as acyl derivatives thereof. Examples of monomers which provide the repeating unit represented by formula [IV] include 4,4'-dihydroxybiphenyl and ester-forming derivatives such as acyl derivatives thereof.

Further, the wholly aromatic liquid-crystalline polyester resin of the present invention essentially comprises the aromatic dicarbonyl repeating unit represented by formula [V]:

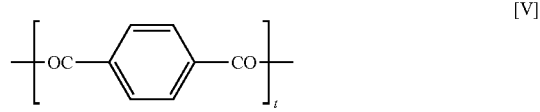

wherein t represents molar proportion (mol %) of the repeating unit represented by formula [V] in the wholly aromatic liquid-crystalline polyester resin of the present invention.

The wholly aromatic liquid-crystalline polyester resin of the present invention comprises, as an aromatic dicarbonyl repeating unit, 20-40 mol %, preferably 25-35 mol %, and more preferably 28-32 mol % of the repeating unit represented by formula [V] based on the total amount of repeating units constituting the wholly aromatic liquid-crystalline polyester resin of the present invention.

Examples of monomers which provide the repeating unit represented by formula [V] include terephthalic acid and ester-forming derivatives such as ester derivatives and acid halide thereof.

In the wholly aromatic liquid-crystalline polyester resin of the present invention, p, q, r, s and t satisfy the following formula:

$$p+q+r+s+t=100.$$

In addition, in the wholly aromatic liquid-crystalline polyester resin of the present invention, the total molar content of aromatic dioxy repeating units represented by formulae [III] and [IV] and the molar content of the aromatic dicarbonyl repeating unit represented by formula [V] are preferably substantially equimolar.

The wholly aromatic liquid-crystalline polyester resin of the present invention which consists of the repeating units shown by the formulae [I] to [V] has a melt viscosity (P1) of 15-150 Pa·s, preferably 30-90 Pa·s and has a melt viscosity (P2) of 5-50 Pa·s, preferably 10-30 Pa·s, wherein P1 is a melt viscosity at a crystalline melting temperature measured under the condition of shear rate 1000 sec$^{-1}$ and P2 is a melt viscosity at a temperature of the crystalline melting temperature +20° C. measured under the same shear rate condition as P1. In the present invention, a melt viscosity of the wholly aromatic liquid-crystalline polyester resin is measured under the condition of shear rate 1000 sec$^{-1}$ using a capillary with the size 0.7 mmφ×10 mm.

The ratio P1/P2, wherein P1 is a melt viscosity at a crystalline melting temperature measured under the condition of shear rate 1000 sec$^{-1}$ and P2 is a melt viscosity at a temperature of the crystalline melting temperature +20° C. measured under the same condition as P1, is an index of the temperature dependency of melt viscosity of the wholly aromatic liquid-crystalline polyester resin of the present invention. The wholly aromatic liquid-crystalline polyester resin of the present invention shows a ratio P1/P2 of equal to or lower than 3.0, preferably equal to or lower than 2.7, more preferably equal to or lower than 2.5, and the most preferably equal to or lower than 2.3.

When the ratio P1/P2 is higher than 3.0, the blister formation tends to be enhanced because the viscosity of the resin decreases greatly when the temperature of the resin is increased by the evolution of share heat in dies, which results in the development of jetting (disturbing phenomenon due to the meandering flow of the resin in cavities) and the wrapping of air in dies. The lower limit of the ratio P1/P2 is 1.0. The ratio P1/P2 is preferably near 1.0. The nearer the P1/P2 is to 1.0, the less jetting is developed and the fewer blisters are formed.

In the present invention, the crystalline melting temperature (hereinafter also referred to as Tm) is the value measured by the following method:
<Method for Determining the Crystalline Melting Temperature>

The differential scanning calorimeter (DSC) is used. The LCP sample to be examined is heated from room temperature at a rate of 20° C./minute and the endothermic peak (Tm1) is recorded. Thereafter, the sample is kept at a temperature 20-50° C. higher than Tm1 for 10 minutes. The sample is then cooled to room temperature at the rate of 20° C./minute and is heated again at the rate of 20° C./minute. The endothermic peak found in the final step is recorded as the crystalline melting temperature (Tm) of the sample LCP.

The wholly aromatic liquid-crystalline polyester resin of the present invention has a deflection temperature under load of equal to or higher than 230° C., preferably 230-320° C., more preferably 230-300° C., and the most preferably 235-280° C.

In the present invention, the DTUL (deflection temperature under load) is the value determined according to the following method:
<Method for Determining Deflection Temperature Under Load>

A test piece of the LCP sample with length of 127 mm, width of 12.7 mm, and thickness of 3.2 mm is molded. Deflection temperature is measured using the test strip according to ASTM D648 under a load of 1.82 MPa and a heating rate of 2° C./min. The temperature at which the test strip gives a predetermined level of deflection (2.54 mm) is recorded as the deflection temperature under load.

When the deflection temperature under load is lower than 230° C., the LCP resin exhibits insufficient heat resistance and tends to develop heat deformation and warpage when being heated during the reflow process. When the deflection temperature under load is higher than 320° C., the crystalline melting temperature of the LCP resin becomes too high to mold and then molding processability is impaired.

Methods for preparing the wholly aromatic liquid-crystalline polyester resin of the present invention are explained below.

The method for preparing the wholly aromatic liquid-crystalline polyester resin of the present invention is not limited and any method known to the art can be employed. For example, conventional polymerization methods such as molten acidolysis and slurry polymerization methods for preparing polymer to give ester bonding among the monomers which give the above described repeating units represented by the formulae [I] to [V] may be employed.

The molten acidolysis method is preferably used for preparing the wholly aromatic liquid-crystalline polyester resin of the present invention. In this method, the monomers are heated to yield a molten solution and then the solution is reacted to yield the molten polymer. The final step of this method may be carried out in vacuo to facilitate removal of volatile by-products such as acetic acid or water.

The slurry polymerization method is characterized by the fact that monomers are reacted in a heat-exchange fluid to give a solid-state polymer in the form of suspension in the heat-exchange liquid medium.

In either the molten acidolysis method or the slurry polymerization method, the polymerizing monomers which are used for preparing the wholly aromatic liquid-crystalline polyester resin may be in the form of lower acyl derivatives obtained by acylating the hydroxyl group at room temperature. The lower acyl group may have preferably 2-5, and more preferably 2-3 carbon atoms. Acetylated monomers are the most preferably used for the reaction.

The lower acyl derivatives of the monomers may be those prepared beforehand by acylating the monomers independently or may be those produced in the reaction system by adding an acylating agent such as acetic anhydride to the monomers upon preparing the wholly aromatic liquid-crystalline polyester resin.

In either the molten acidolysis method or the slurry polymerization method, a catalyst may be used in the reaction, if desired.

Examples of catalysts include organic tin compounds such as dialkyl tin oxide (ex. dibutyl tin oxide) and diaryl tin oxide;

titanium compounds such as titanium dioxide, antimony trioxide, alkoxy titanium silicate and titanium alkoxide; alkaline or alkaline earth metal salts of carboxylic acid such as potassium acetate; salts of inorganic acid (ex. $K_2SO_4$); Lewis acid (ex. $BF_3$); and gaseous acid catalysts such as halogenated hydrogen (ex. HCl).

When a catalyst is used, the amount of the catalyst added to the reaction based on the total of monomers may preferably be 1-1000 ppm, and more preferably 2-100 ppm.

The wholly aromatic liquid-crystalline polyester resin of the present invention may be obtained from the polymerizing reaction vessel in molten state and processed to give pellets, flakes or powders.

Thereafter, the wholly aromatic liquid-crystalline polyester resin in the form of pellets, flakes or powders may be subjected to the solid phase heating process in vacuo or under inert gas atmospheres such as nitrogen gas and helium gas in order to improve heat-resistance and the like, if desired.

To the wholly aromatic liquid-crystalline polyester resin of the present invention thus obtained, at least one of fibrous, lamellar and/or powder inorganic fillers, additional additives and additional resin components which are described below may be added to give a wholly aromatic liquid-crystalline polyester resin composition.

Examples of inorganic fillers which may be contained in the wholly aromatic liquid-crystalline polyester resin composition of the present invention include at least one of glass fiber, milled glass, silica-alumina fiber, alumina fiber, carbon fiber, aramid fiber, potassium titanate whisker, aluminium borate whisker, wollastonite, talc, mica, graphite, calcium carbonate, dolomite, clay, glass flake, glass beads, barium sulfate and titanium oxide. Among them, glass fiber is preferably used because of its good balance of physical properties and cost.

The wholly aromatic liquid-crystalline polyester resin composition of the present invention comprises 100 parts by weight of the wholly aromatic liquid-crystalline polyester resin and 1-200 parts by weight, preferably 5-100 parts by weight of the inorganic filler.

If the amount of the inorganic filler is above 200 parts by weight based on 100 parts by weight of the wholly aromatic liquid-crystalline polyester resin, the moldability of the wholly aromatic liquid-crystalline polyester resin composition tends to be decreased or the exhausting of the cylinder or die of the molding device tends to be increased.

The wholly aromatic liquid-crystalline polyester resin composition according to the present invention may further be admixed with one or more additional additives, unless the additional additives impair the object of the present invention. For example, molding lubricants such as higher aliphatic acid, higher aliphatic ester, higher aliphatic amide, higher aliphatic acid metal salt, polysiloxane and fluorocarbon resin; colorants such as dyes and pigments; antioxidant; thermal stabilizer; UV absorbent; antistatic agent; and surface active agent may be admixed. The term "higher" group herein used refers to the group of 10-25 carbon atoms.

The wholly aromatic liquid-crystalline polyester resin composition of the present invention may comprise 100 parts by weight of the wholly aromatic liquid-crystalline polyester resin and 0.1-10 parts by weight, preferably 0.5-5 parts by weight of the additional additives.

If the amount of the additional additives is above 10 parts by weight based on 100 parts by weight of the wholly aromatic liquid-crystalline polyester resin, the moldability of the wholly aromatic liquid-crystalline polyester resin composition tends to be decreased or the thermal stability of the wholly aromatic liquid-crystalline polyester resin composition tends to be impaired.

Molding lubricants such as higher aliphatic acid, higher aliphatic ester, higher aliphatic acid metal salt or fluorocarbon-type surfactant may be added to the pellets of the wholly aromatic liquid-crystalline polyester resin or the wholly aromatic liquid-crystalline polyester resin composition before subjecting the pellets to the molding process, so that the agents adhere to the outer surfaces of the pellets.

The wholly aromatic liquid-crystalline polyester resin composition of the present invention may comprise one or more additional resin components which can be subjected to processing such as molding at the same range of temperatures as the wholly aromatic liquid-crystalline polyester resin of the present invention, unless the additional resin components impair the object of the present invention. Examples of additional resin components include thermoplastic resins such as polyamide, polyester, polyacetal, polyphenylene ether and denatured derivatives thereof, polysulfone, polyethersulfone, polyether imide and polyamideimide, and thermosetting resins such as phenol resin, epoxy resin and polyimide resin. The amount of the additional resin components is not limited, and may be determined dependent on the intended property. Typically, such additional resins may be added to the wholly aromatic liquid-crystalline polyester resin composition in an amount of 0.1-100 parts by weight, preferably 0.1-80 parts by weight per 100 parts by weight of the wholly aromatic liquid-crystalline polyester resin.

The wholly aromatic liquid-crystalline polyester resin composition of the present invention is obtained by mixing the wholly aromatic liquid-crystalline polyester resin and the inorganic fillers, additional additives and additional resin components. The wholly aromatic liquid-crystalline polyester resin composition of the present invention may be obtained by melt-kneading the mixture of the wholly aromatic liquid-crystalline polyester resin and the inorganic fillers, additional fillers and/or additional resin components using a kneading machine such as a Banbury mixer, kneader, single-screw extruder, twin-screw extruder or the like at a temperature in the range from the crystalline melting temperature of the wholly aromatic liquid-crystalline polyester resin to the crystalline melting temperature +20° C.

The wholly aromatic liquid-crystalline polyester resin or the wholly aromatic liquid-crystalline polyester resin composition of the present invention may be processed in a conventional manner to give molded articles, film, sheets, bonded textiles and the like. For example, injection molding or extrusion techniques may preferably be used.

The wholly aromatic liquid-crystalline polyester resin and the wholly aromatic liquid-crystalline polyester resin composition of the present invention exhibit excellent blister resistance as well as good mechanical properties such as high heat resistance, high flexural strength and high Izod impact strength and, therefore, are suitable for manufacturing electronic parts of antennae, connectors, substrates and the like.

The present invention is further described in reference to the following Examples.

In the Examples and Comparative Examples, crystalline melting temperature, melt viscosity, deflection temperature under load (DTUL), evaluation of blister formation, flexural strength and Izod impact strength were assessed by the following procedures:

<Method for Determining Crystalline Melting Temperature>

The differential scanning calorimeter (DSC) Exstar 6000 (Seiko Instruments Inc., Chiba, Japan) or the same type of DSC device was used. The LCP sample to be examined was heated from room temperature at a rate of 20° C./minute and the endothermic peak (Tm1) was recorded. Thereafter, the sample was kept at a temperature 20-50° C. higher than Tm1 for 10 minutes. The sample was then cooled to room temperature at the rate of 20° C./minute and was heated again at the rate of 20° C./minute. The endothermic peak found in the final step was recorded as the crystalline melting temperature (Tm) of the LCP sample.

<Method for Determining Melt Viscosity>

The melt viscosity measurement device (CAPILOGRAPH 1D, Toyo Seiki Seisaku-Sho, Ltd., Tokyo, Japan) or the same type of melt viscosity measurement device was used. By using a capillary of 0.7 mm$\phi$×10 mm, the melt viscosity at the crystalline melting temperature (Tm) (P1) and the melt viscosity at a temperature of the crystalline melting temperature (Tm)+20° C. (P2) of the LCP sample were measured under the condition of shear rate 1000 sec$^{-1}$. In the case where the sample contained glass fiber, a capillary of 1.0 mm$\phi$×10 mm was used.

<Method for Determining Deflection Temperature Under Load>

A test piece with a length of 127 mm, width of 12.7 mm and thickness of 3.2 mm was molded using an injection-molding machine (UH1000-110, Nissei Plastic Industrial Co., Ltd., Nagano, Japan) or the same type of injection-molding machine. Deflection temperature was measured using the test piece according to ASTM D648 under a load of 1.82 MPa and with a heating rate of 2° C./min. The temperature at which the test piece showed a predetermined level of deflection (2.54 mm) was recorded as the deflection temperature under load (DTUL).

<Evaluation of Blister Formation>

The test strips each with the size of 127×12.7×0.8 mm were heated in a Geer type oven at 260° C. for 10 minutes and then left to cool. The blisters formed on the surfaces of the test strips were visually observed and the number of the blisters on the surfaces of the test strips was counted. The test was conducted using 10 test strips for each LCP sample. The test strips which developed 0 to 1 blisters were evaluated as ◯, those which developed 2 to 3 blisters were evaluated as Δ and those which developed 4 or more blisters were evaluated as X.

<Method for Determining Flexural Strength>

A bending test piece with a size of 12.7×64×2.0 mm was molded using an injection-molding machine (MINIMAT M26/15, Sumitomo Heavy Industries, Ltd., Tokyo, Japan) with a clamping pressure of 15 tons, cylinder temperature of the crystalline melting point+20° C. and die temperature of 70° C. Flexural strength was measured by the three-point bend test using INSTRON 5567 (universal testing machine, Instron Japan Company, Ltd., Kanagawa, Japan) with a span distance of 40.0 mm and a compaction rate of 1.3 mm/min.

<Method for Determining Izod Impact Strength>

Izod impact strength was measured according to ASTM D256 using the same test piece as that used for measuring flexural strength.

In the Examples and Comparative Examples, the following abbreviations are used:
POB: parahydroxybenzoic acid
BON6: 6-hydroxy-2-naphthoic acid
BP: 4,4-dihydroxybiphenyl
HQ: hydroquinone
TPA: terephthalic acid

EXAMPLE 1

POB, BON6, BP, HQ and TPA were fed into a reaction container equipped with an agitating device with torque-meter and a condenser in the molar proportion shown in Table 1 so that the total monomer amount was 6.5 mol. Then acetic anhydride 1.03 fold moles to the total amount (moles) of hydroxy groups of the monomers were added to the container. The mixture was polymerized under the following condition.

Under the nitrogen atmosphere, the mixture was heated from room temperature to 150° C. over a period of 1 hour and kept at 150° C. for 30 minutes, then heated to 350° C. over a period of 7 hours while the by-product acetic acid was distilled out. Then the pressure was reduced to 5 mmHg over a period of 80 minutes. When the torque reached the predetermined level, the polymerizing reaction was terminated. The resulting polymer was removed from the container in the form of strands and the strands were cut to give pellets of a liquid-crystalline polyester resin. As a result, the approximately calculated theoretical amount of acetic acid was distilled out.

The crystalline melting temperature of the wholly aromatic liquid-crystalline polyester resin measured using the differential scanning calorimeter was 335° C. The melt viscosity, deflection temperature under load, flexural strength and Izod impact strength of the wholly aromatic liquid-crystalline polyester resin as well as the result of evaluation of blister formation are shown in Table 2.

EXAMPLES 2, 3 AND COMPARATIVE EXAMPLES 1 to 5

Wholly aromatic liquid-crystalline polyester resins were obtained in the same manner as that of Example 1, except that the type and molar proportion of monomers fed in the reaction container as well as the heated temperature and the time period required for reaching the heated temperature from 150° C. (heating period) were changed as shown in Table 1. The crystalline melting temperature, melt viscosity, deflection temperature under load, flexural strength and Izod impact strength of the wholly aromatic liquid-crystalline polyester resins as well as the results of evaluation of blister formation are shown in Table 2.

EXAMPLE 4

To 100 parts by weight of the wholly aromatic liquid-crystalline polyester resin of Example 1, glass fiber in parts by weight shown in Table 2 was added to give a mixture. The mixture was melt-kneaded using a twin-screw extruder (PCM-30, Ikegai Co., Ltd., Ibaragi, Japan) to yield strands of a wholly aromatic liquid-crystalline polyester resin composition. The strands were then cut to give pellets of the wholly aromatic liquid-crystalline polyester resin composition.

COMPARATIVE EXAMPLE 6

The wholly aromatic liquid-crystalline polyester resin of Comparative Example 1 was used in the same manner as Example 4 to give pellets of a wholly aromatic liquid-crystalline polyester resin composition.

The wholly aromatic liquid-crystalline polyester resins and the wholly aromatic liquid-crystalline polyester resin composition of Examples 1 to 4 did not develop any blisters and exhibited high heat resistance as shown by the deflection temperature under load. The wholly aromatic liquid-crystalline polyester resins and the wholly aromatic liquid-crystalline polyester resin composition of Examples to 4 showed significantly improved blister resistance without impairing mechanical properties such as flexural strength and Izod impact strength.

On the other hand, the wholly aromatic liquid-crystalline polyester resins and the wholly aromatic liquid-crystalline polyester resin composition of Comparative Examples 1 to 6 showed significant blister formation though they exhibited good mechanical properties such as flexural strength and Izod impact strength similar to Examples 1 to 4.

TABLE 1

|  |  | POB | BON6 | HQ | BP | TPA | Heated temperature (° C.)/ Heating period (hour) |
|---|---|---|---|---|---|---|---|
| Example 1 | weight (g) | 314.2 | 61.2 | 114.5 | 169.4 | 323.9 | 350/7 |
|  | mol % | 35 | 5 | 16 | 14 | 30 |  |
| Example 2 | weight (g) | 403.9 | 61.2 | 96.6 | 139.2 | 323.9 | 350/7 |
|  | mol % | 45 | 5 | 13.5 | 11.5 | 30 |  |
| Example 3 | weight (g) | 332.1 | 36.7 | 128.8 | 145.2 | 323.9 | 375/8 |
|  | mol % | 37 | 3 | 18 | 12 | 30 |  |
| Comparative Example 1 | weight (g) | 314.2 | 61.2 | 100.2 | 193.6 | 323.9 | 350/7 |
|  | mol % | 35 | 5 | 14 | 16 | 30 |  |
| Comparative Example 2 | weight (g) | 359.1 | — | 121.7 | 157.3 | 323.9 | 390/9 |
|  | mol % | 40 | — | 17 | 13 | 30 |  |
| Comparative Example 3 | weight (g) | 224.4 | 183.5 | 121.7 | 157.3 | 323.9 | 350/7 |
|  | mol % | 25 | 15 | 17 | 13 | 30 |  |
| Comparative Example 4 | weight (g) | 377.0 | 195.7 | 150.3 | — | 226.7 | 350/7 |
|  | mol % | 42 | 16 | 21 | — | 21 |  |
| Comparative Example 5 | weight (g) | 655.2 | 330.3 | — | — | — | 330/6 |
|  | mol % | 73 | 27 | — | — | — |  |

TABLE 2

|  | Glass fiber (weight parts) | Tm (° C.) | Melt viscosity (Pa·s) P1 | Melt viscosity (Pa·s) P2 | P1/P2 | Deflection temperature under load (DTUL) (° C.) | Evaluation of blister formation | Flexural strength (MPa) | Izod impact strength (J/m) |
|---|---|---|---|---|---|---|---|---|---|
| Example 1 | 0 | 335 | 30 | 18 | 1.7 | 240 | ○ | 140 | 270 |
| Example 2 | 0 | 330 | 42 | 19 | 2.2 | 242 | ○ | 150 | 250 |
| Example 3 | 0 | 354 | 45 | 28 | 1.6 | 271 | ○ | 135 | 240 |
| Example 4 | 42.9 | 340 | 40 | 30 | 1.3 | 275 | ○ | 180 | 100 |
| Comparative Example 1 | 0 | 330 | 64 | 20 | 3.2 | 225 | △ | 140 | 250 |
| Comparative Example 2 | 0 | 370 | 76 | 19 | 4.0 | 233 | △ | 130 | 190 |
| Comparative Example 3 | 0 | 290 | 62 | 22 | 2.8 | 200 | X | 160 | 300 |
| Comparative Example 4 | 0 | 330 | 78 | 10 | 7.8 | 220 | △ | 160 | 250 |
| Comparative Example 5 | 0 | 280 | 350 | 100 | 3.5 | 180 | X | 167 | 500 |
| Comparative Example 6 | 42.9 | 330 | 95 | 26 | 3.7 | 250 | △ | 190 | 80 |

What is claimed is:

1. A wholly aromatic liquid-crystalline polyester resin, consisting of the repeating units shown by the formulae [I]-[V]:

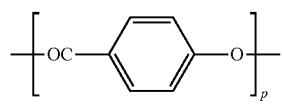     [I]

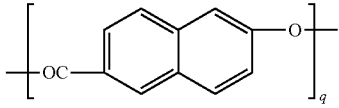     [II]

     [III]

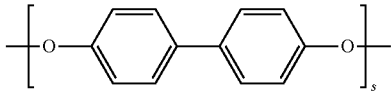     [IV]

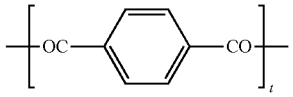     [V]

wherein p, q, r, s and t represent molar proportion (mol %) of repeating units respectively in the liquid-crystalline polyester resin and satisfy the following formulae:

$25 \leq p \leq 45;$ $2 \leq q \leq 10;$ $10 \leq r \leq 20;$ $10 \leq s \leq 20;$ $20 \leq t \leq 40;$ $r > s;$ $p + q + r + s + t = 100;$ having a ratio P1/P2 of equal to or lower than 3.0, wherein P1 is a melt viscosity at a crystalline melting temperature measured under the condition of shear rate 1000 sec$^{-1}$ and P2 is a melt viscosity at a temperature of the crystalline melting temperature+20° C. measured under the same condition as P1; and having a deflection temperature under load (DTUL) of equal to or higher than 230° C.

2. A wholly aromatic liquid-crystalline polyester resin composition comprising:
- 100 parts by weight of the wholly aromatic liquid-crystalline polyester resin according to claims 1, and
- 1-200 parts by weight of a fibrous, lamellar and/or powder inorganic filler.

3. The wholly aromatic liquid-crystalline polyester resin composition according to claim 2, in which the inorganic filler is selected from the group consisting of glass fiber, milled glass, silica-alumina fiber, alumina fiber, carbon fiber, aramid fiber, potassium titanate whisker, aluminium borate whisker, wollastonite, talc, mica, graphite, calcium carbonate, dolomite, clay, glass flake, glass beads, barium sulfate, titanium oxide and a mixture thereof.

4. The wholly aromatic liquid-crystalline polyester resin composition according to claim 3, in which the inorganic filler is glass fiber.

5. A molded article capable of being obtained by molding the wholly aromatic liquid-crystalline polyester resin according to claim 1.

6. A molded article capable of being obtained by molding the wholly aromatic liquid-crystalline polyester resin composition according to claim 2.

* * * * *